United States Patent [19]
Heroux

[11] 3,817,097

[45] June 18, 1974

[54] METHOD AND APPARATUS FOR TESTING HYDRAULIC PUMPS

[76] Inventor: Thomas M. Heroux, 485 Forest Ave., Glen Ellyn, Ill.

[22] Filed: June 5, 1972

[21] Appl. No.: 259,397

[52] U.S. Cl. .............................. 73/168, 73/49.7
[51] Int. Cl. ..................................... G01m 19/00
[58] Field of Search ............ 73/168, 49.7; 251/120, 251/121, 207

[56] References Cited
UNITED STATES PATENTS

| | | | |
|---|---|---|---|
| 1,023,596 | 4/1912 | Roessler | 251/207 |
| 2,859,611 | 11/1958 | Morse | 73/168 |
| 3,548,861 | 12/1970 | Mullins | 137/318 |
| 3,612,102 | 10/1971 | Hulsey | 251/207 |

*Primary Examiner*—Richard C. Queisser
*Assistant Examiner*—Denis E. Corr
*Attorney, Agent, or Firm*—Wolfe, Hubbard, Leydig, Voit & Osann, Ltd.

[57] ABSTRACT

A method and apparatus for testing hydraulic pumps in the field. A valve is connected permanently in the hydraulic line, with a movable valve member having a large orifice normally aligned with the hydraulic line to permit unrestricted flow of hydraulic fluid through the valve. The valve body forms a test opening leading from the fluid passageway within the valve to the exterior surface thereof, where the opening is closed by a quick coupler. When the pump is to be tested, the coupler is opened by fitting a mating sleeve thereover, a pressure gage is connected to the test opening, the movable valve member is moved to align a small orifice with the hydraulic line to restrict the flow of hydraulic fluid through the line, and the resulting pressure reading on the gage is used to determine whether the pump is operating satisfactorily. The dial of the gage is calibrated to indicate a "go" or "no go" condition of the pump, and may also be provided with numerical indicia to indicate the pressure in numerical units such psi.

11 Claims, 11 Drawing Figures

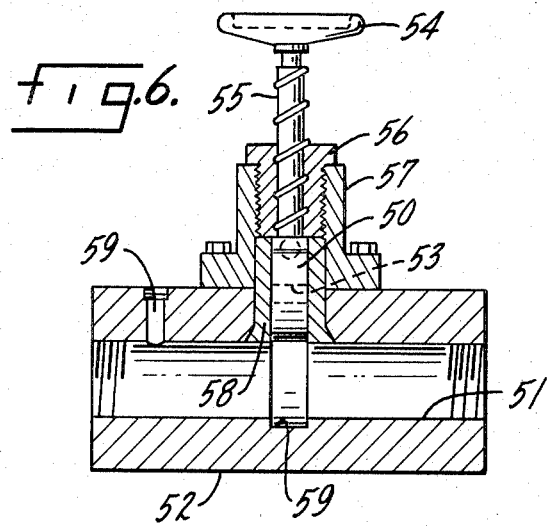
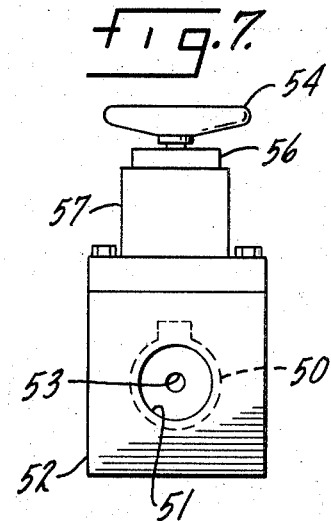
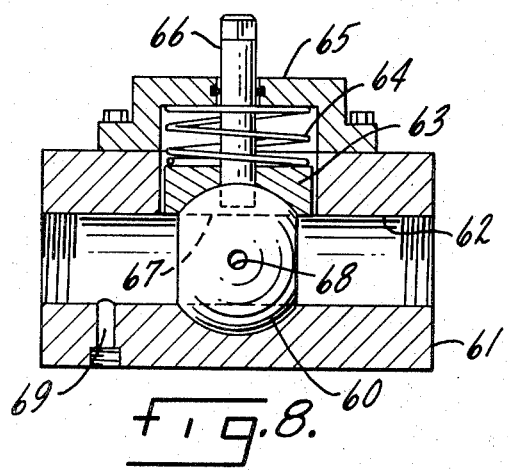
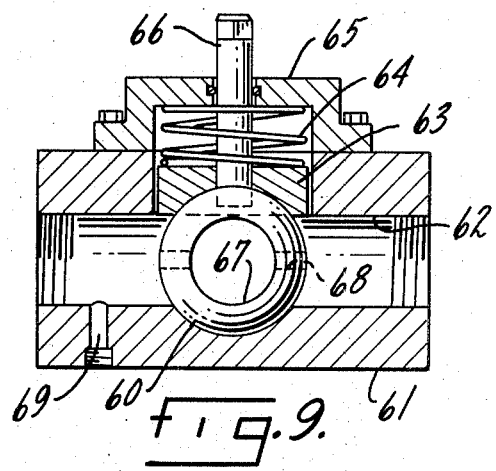
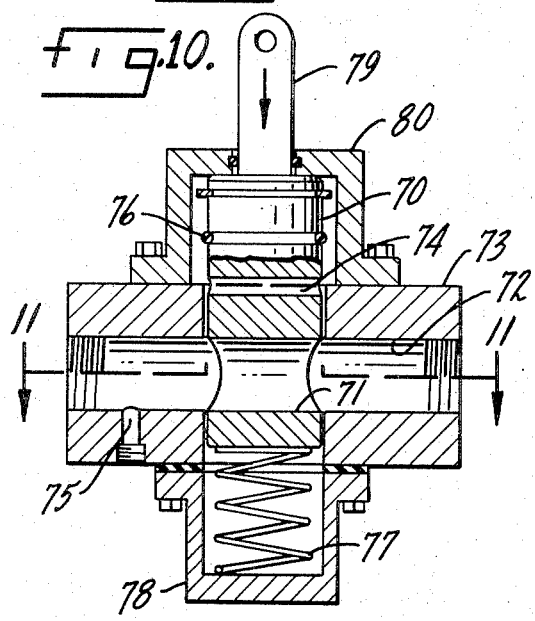
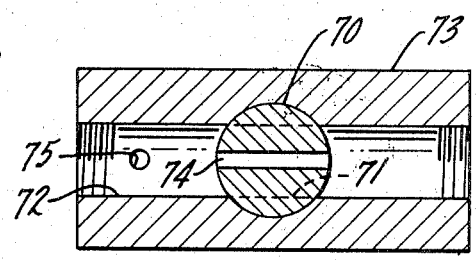

METHOD AND APPARATUS FOR TESTING HYDRAULIC PUMPS

The present invention relates generally to the testing of hydraulic pumps and, more particularly, to an improved system for testing hydraulic pumps in the field to determine when the pumps should be serviced or replaced.

It is a primary object of the present invention to provide an improved system for testing hydraulic pumps in the field without opening the hydraulic system, thereby avoiding the possibility of dirt or other foreign matter entering and contaminating the system.

Another object of the invention is to provide an improved pump testing system of the foregoing type which minimizes the time required to set up the test equipment, run the test and then remove the test equipment. In this connection, a related object is to provide such a test system which minimizes the down time of the field equipment for test purposes. One specific object of the invention is to provide such a test system which permits a pump to be tested in 10 seconds or less.

It is a further object of the invention to provide an improved hydraulic pump test system of the type described above which is extremely simple to operate and which virtually eliminates any possibility of improper set-up or operation.

Yet another object of the invention is to provide such an improved pump test system which yields extremely reliable test data. A related object of the invention is to provide such a test system which completely eliminates any subjective judgments by the test operator.

A still further object of the invention is to provide such an improved pump test system which is simple to check for performance in the field.

Still another object of the invention is to provide such an improved pump test system which can be efficiently manufactured at a low cost, and which is extremely durable so that it can also be maintained at a low cost while providing a long operating life.

Other objects and advantages of the invention will be apparent from the following detailed description taken in connection with the accompanying drawings, in which:

FIG. 6 is a sectional view of a modified valve assembly for use in the system of FIG. 1, with the movable valve element in a first position;

FIG. 7 is an end elevation of the valve assembly of FIG. 6 with the movable valve element in a second position;

FIG. 8 is a sectional view of another modified valve assembly for use in the system of FIG. 1 with the movable valve element in a first position;

FIG. 9 is the same section shown in FIG. 8 with the movable valve element in a second position;

FIG. 10 is a sectional view of still another modified valve assembly for use in the system of FIG. 1 with the movable valve element in a first position; and FIG. 11 is a section taken along line 11—11 in FIG. 10 with the movable valve element in a second position.

While the invention will be described in connection with preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
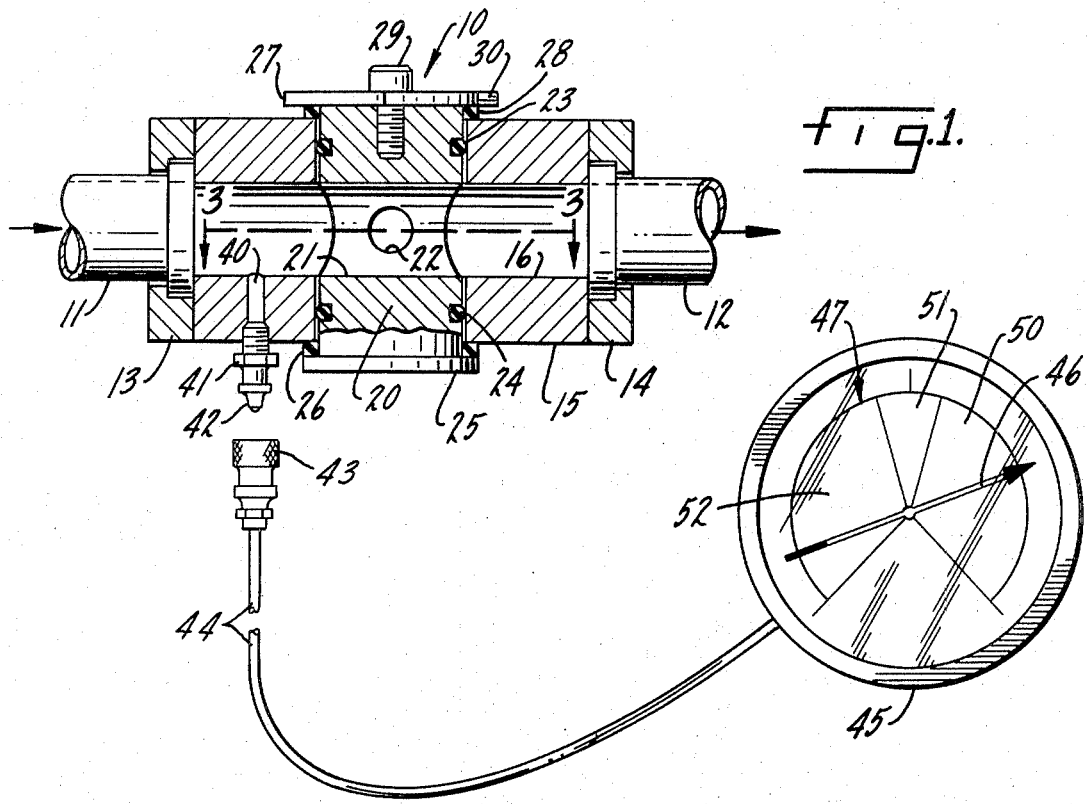
FIG. 1 is a side elevation, partially in section, of a pump test system embodying the invention.

Turning now to the drawings and referring first to FIG. 1, there is shown a pump test system including a valve 10 permanently connected in a hydraulic line carrying pressurized hydraulic fluid supplied by the pump to be tested. Thus, the valve 10 is connected to two flanged sections 11 and 12 of the hydraulic line by means of a standard SAE four-bolt flanges 13 and 14 bolted to the inlet and outlet ends, respectively, of the valve body 15. The valve body 15 forms a longitudinal passageway 16 having a diameter equal to the inside diameter of the main line sections 11 and 12.

Figure 2:
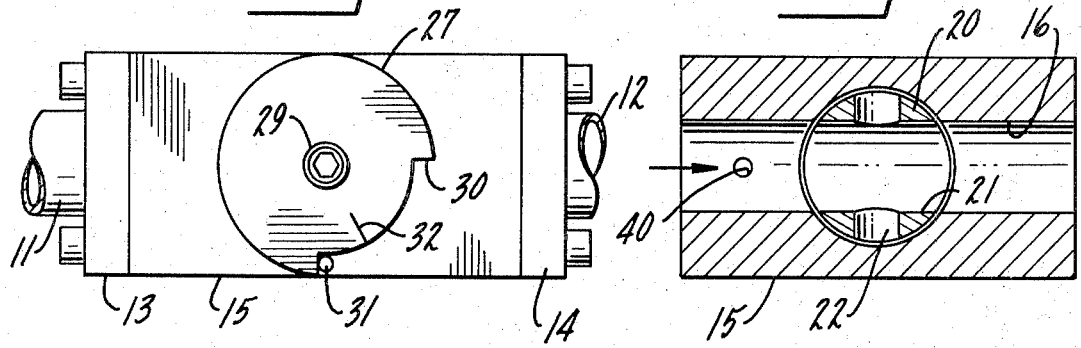
FIG. 2 is a top plan view of the valve assembly in the system of FIG. 1.
Figure 3:
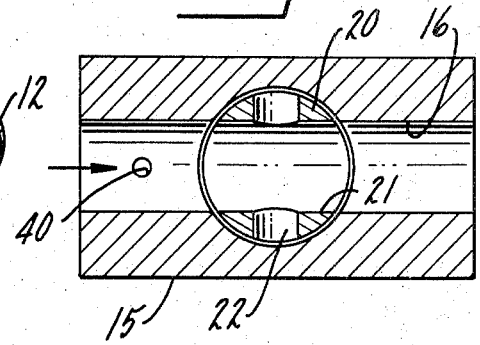
FIG. 3 is a section taken along line 3—3 in FIG. 1 with the movable valve element in a first position.

In accordance with one important aspect of the present invention, the valve has a movable member with a first orifice at least as large as the inside diameter of the hydraulic line for permitting unrestricted flow of hydraulic fluid through the valve when the movable member is in a first position, and a second orifice smaller than the inside diameter of the hydraulic line for restricting flow of hydraulic flow through the valve when the movable member is in a second position. Thus, in the embodiment of FIGS. 1-5, a spool 20 journaled in the center of the valve body 15 forms a large orifice 21 with the same diameter as that of the passageway 16 so that when the spool 20 is in the position shown in FIGS. 1-3, the valve does not restrict the flow of hydraulic fluid therethrough. When the spool 20 is turned 90°, to the position shown in FIG. 5, a small orifice 22 restricts the flow of hydraulic fluid through the valve.

To prevent the leakage of hydraulic fluid through the valve, a pair of O-rings 23 and 24 are mounted in circumferential grooves in the upper and lower portions of the spool body, with the outside peripheries of the O-rings in bearing engagement with the valve body to form fluid seals between the spool 20 and the valve body 15. At the bottom of the spool, an integral flange 25 is drawn upwardly against a washer 26 pressing against the bottom of the valve body 15. At the top of the spool, a retaining plate 27 and an underlying washer 28 are held down against the top of the valve body 15 by means of a locking bolt 29 which may also carry a suitable handle (not shown) for turning the spool 20.

Rotation of the spool 20 is limited to a 90° arc by means of a cutout 30 extending around 90° of the periphery of the retaining plate 27 and cooperating with a stop pin 31 affixed to the valve body 15. When the stop pin 31 abuts one end of the cutout 30, the spool 20 is in the position shown in FIGS. 1-3 with the large orifice 21 aligned with the two sections 11 and 12 of the hydraulic line. When the stop pin 31 abuts the other end of the cutout, the spool 20 is in the position shown in FIG. 5 with the small orifice 22 aligned with the line sections 11 and 12. In between the two end stop positions, alignment of the pin 30 with a marker 32 on the plate 27 indicates that the spool is in the intermediate position shown in FIG. 4, which is used for calibration purposes as will be described in more detail below.

In accordance with a further aspect of the invention, the valve body forms a test opening leading from the exterior surface of the valve body to the interior fluid passageway, and a connecting member is attached to the valve body at the outer end of the test opening for connecting a pressure gage to the test opening. Thus, in the illustrative arrangement of FIG. 1, a hole 40 is formed in the valve body 15 and is threaded at its outer end to receive a hollow connector 41. During normal operation of the hydraulic system, a quick coupler 42 is threaded onto the outer end of the connector 41 to completely close and seal the hole 40. The quick coupler 42 is a conventional coupling device including a ball check which is normally biased to its closed position, but is automatically retracted to an open position when a mating sleeve is fitted over the coupler; one example of such a coupler is the PCN coupler made by Snap Tite Manufacturing Company. When the pump is to be tested, a sleeve 43 on the end of a flexible tube or hose 44 is fitted onto the outer end of the coupler 42 to connect the hole 40 to the tube 44. For the purpose of measuring the fluid pressure within the valve 10, the opposite end of the tube 44 is connected to a pressure gage 45 having a pointer 46 cooperating with a scale 47. As pressure increases, the pointer 46 advances in the clockwise direction.

In keeping with the invention, the pump is tested (with its normal load removed) by simply connecting the gage 45 to the coupler 42, turning the valve spool 20 to position the small orifice 22 in line with the valve passageway 16 (FIG. 5), and observing the position of the pointer 46 with the pump operating at a preselected speed to supply a preselected hydraulic fluid to the valve 10 at a preselected temperature. The small test orifice 22 is designed to simulate a load which produces a known pressure when the pump is operating at maximum efficiency under these preselected operating conditions, and the gage 45 indicates whether the pump is producing (1) a pressure sufficiently close to the known pressure to indicate satisfactory pump operation, (2) a pressure so far below the known pressure that the pump should be serviced, or (3) an intermediate pressure indicating that the pump efficiency is high enough to permit the pump to remain in operation but that it has deteriorated to a level indicating that it should be tested again in the near future. For example, the orifice 22 may have an open area selected to produce a pressure of 1,000 psi when a certain pump is operated at 1,800 RPM with 10W oil at 120° F. -- if the pump is operating at 100 percent efficiency. If the pump is tested at 1,800 RPM with 10W oil at 120° F., any degradation in the efficiency of the pump is reflected in a proportionate pressure reduction below 1,000 psi, as indicated by the gauge 45. To remove the normal load from the pump before it is tested, the conventional directional valve downstream of the test valve 10 is set in its center position to return the hydraulic fluid to tank, so that the only load on the pump during the test is the load simulated by the test valve 10.

Figure 5:
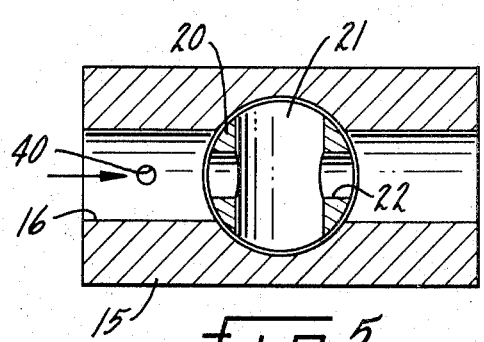
FIG. 5 is the same section shown in FIG. 3 with the movable valve element in a third position.

As can be seen in FIG. 5, the spool-type valve actually produces two restricted orifices 22 in series, separated by the large orifice 21. This is a preferred valve construction because theoretically the two orifices in series are more stable to variations in the temperature and/or viscosity of the hydraulic fluid than a single orifice.

In order to simplify the use of the illustrative test equipment, the dial of the gage 45 is calibrated to indicate a "go", "no go" or "marginal" condition of the pump, rather than to indicate a numerical pressure condition that would require translation by the human operator. Thus, the dial of the illustrative pressure gage 45 is simply provided with three colored areas: (1) a green "go" area 50 indicating a pressure sufficiently close to the 100 percent efficiency level that the pump is considered to be operating satisfactorily, (2) a red "no go" area 52 indicating a pressure sufficiently far below the 100 percent efficiency pressure that the pump should be serviced, and (3) an intermediate "marginal" yellow area 51 indicating an intermediate pressure close enough to the 100 percent efficiency pressure that immediate servicing of the pump is not needed, but far enough below the 100 percent efficiency pressure that the pump should be re-tested in the near future. Consequently, all the operator has to do is look at the gage dial, and he immediately knows the ultimate determination made by the test. No calculations or mental interpretations whatever are required.

If desired, the dial of the gage 45 may also be provided with numerical indicia to permit direct readings of the measured pressure in numerical units such as psi, for example.

Figure 4:
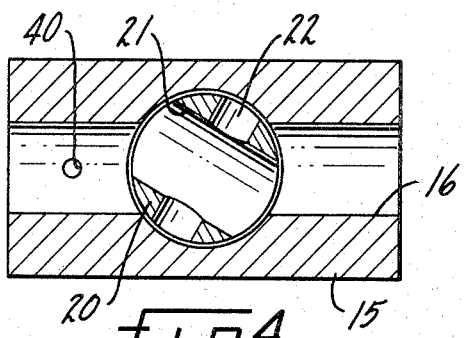
FIG. 4 is the same section shown in FIG. 3 with the movable valve element in a second position.

For the purpose of calibrating the test system, the pump to be tested is set at the selected test speed, and the valve 10 is turned to the calibrating position illustrated in FIG. 4, with the marker 32 aligned with the stop pin 31. In this intermediate position, the valve produces only a small pressure drop in the hydraulic line, e.g., 100 psi, and at this pressure any degradation in the efficiency of the pump has only a negligible effect on the pressure within the unloaded hydraulic line. Consequently, the valve 10 and the pressure gage 45 connected thereto can be used to determine whether the pump is operating at the desired test speed; this is a significant practical advantage because it permits the operator to check the speed of the pump from the location where the test is to be conducted (at the valve 10) rather than returning to the pump location, which may not be as convenient or accessible as the valve location. If desired, calibrating indicia may also be provided on the gage dial, in the red area 52, to facilitate the operator's determination of whether the pump is operating at the selected test speed when the valve is in the calibrating position.

In FIGS. 6 through 11, there are illustrated three different valves which may be used as alternatives to the spool-type valve 10 used in the embodiment of FIGS. 1–5. Thus, in FIGS. 6 and 7 there is illustrated a plug-type valve having a plug 50 mounted for transverse movement between a retracted position shown in FIG. 6, where the plug 50 is clear of the passageway 51 formed by the valve body 52, and an advanced position shown in FIG. 7, where the plug 50 is in line with the passageway 51 with a small orifice 53 in the center of the plug 50 restricting the flow of hydraulic fluid through the valve. Movement of the valve plug 50 between the retracted and advanced positions is effected by rotation of a handle 54 connected to a shaft 55 threaded through a flanged sleeve 56 held in a collar 57 bolted to the valve body 52. When the shaft 55 is threaded downwardly through the sleeve 56, the plug 50 is advanced through a guide block 58 into a recessed plug seat 59 formed in the adjacent side walls of the passageway 51. Of course, this advanced position of the plug 50 is the "test" position where the pressure on the upstream side of the plug 50 is measured by a gage 45 connected to a hole 59 drilled through the valve body 52. To retract the plug 50, the handle 54 is turned to thread the shaft 55 upwardly through the sleeve 56 until the plug is returned to the position shown in FIG. 6.

In FIGS. 8 and 9 there is illustrated a ball-type valve having a rotatable spherical valve member 60 seated in a complementally formed recess in the lower portion of a valve body 61 forming a passageway 62. A similarly recessed retaining plate 63 engages the top of the ball member 60, and a compressed coil spring 64 urges the plate 62, and thus the ball member 60, downwardly against the bottom wall of the valve body 61. The spring 64 is constrained within a collar 65, through which a shaft 66 is journaled for rotating the ball member 60 through a 90° arc of movement. At one end of the 90° arc, the ball member 60 is positioned with a large orifice 67 of the same diameter as that of the passageway 62 aligned coaxially with the passageway 62 so that the valve does not restrict the flow of hydraulic fluid therethrough. When the ball member 60 is turned 90°, to the "test" position shown in FIG. 9, a small orifice 68 restricts the flow of hydraulic fluid through the valve so that the operating efficiency of the pump supplying fluid to the valve can be determined by measurement of the hydraulic pressure on the upstream side of the ball member 60 via a hole 69 drilled through the valve body 61.

In FIGS. 10 and 11 there is illustrated a plunger-type valve having a plunger 70 mounted for transverse movement between a retracted position shown in FIG. 10, where a large orifice 71 is aligned with the passageway 72 formed by a valve body 73, and an advanced position shown in FIG. 11, where a small orifice 74 in the plunger 70 is aligned with the passageway 72. The plunger position shown in FIG. 11 represents the "test" position of the plunger, where the small orifice 74 restricts the flow of hydraulic fluid through the valve so that the efficiency of the pump supplying hydraulic fluid to the valve can be determined by measuring the pressure on the upstream side of the plunger 70 via a gage 45 connected to a hole 75 drilled through the valve body 73. When the plunger 70 is in its advanced or "test" position, an O-ring 76 engages the valve body 73 to provide a fluid seal between the in-line hydraulic passageway 72 and the reciprocating elements of the valve assembly. At the bottom of the plunger 70 a compressed coil spring 77 constrained within a bottom cap 78 urges the plunger toward its retracted position, while a rod 79 connected to the top of the plunger 70 extends upwardly through a collar 80 for controlling movement of the plunger 70 between its advanced and retracted positions. For example, the rod 79 may be connected to a suitable actuating lever (not shown) for sliding the plunger 70 back and forth between its retracted position (FIG. 10) and its advanced or "test" position (FIG. 11).

As can be seen from the foregoing detailed description, the present invention provides an improved system for testing hydraulic pumps in the field by simply connecting a pressure gage to a connector built into the hydraulic system, so that the pump feeding the hydraulic system can be tested without opening the hydraulic system, thereby avoiding the possibility of dirt or other foreign matter entering and contaminating the system. This system also minimizes the time required to set up the test equipment, run the test and then remove the test equipment, thereby minimizing the down time of the field equipment for test purposes. Indeed, it has been found that a test system embodying the present invention permits a pump to be tested in the field in 10 seconds or less. Moreover, the test system provided by this invention is simple to operate and virtually eliminates any possibility of improper set-up or operation, since all that is required is the connection of the gage tube to the test valve. This test system yields extremely reliable test data and, due to the "go"-"no-go" calibration of the test gage, no subjective judgments whatever are required of the human operator. Furthermore, this test system is extremely simple to check for performance in the field; it can be efficiently manufactured at a low cost; and it is extremely durable so that it can be maintained at a low cost while providing a long operating life.

I claim as my invention:

1. A system for testing the efficiency of a hydraulic pump in the field comprising the combination of a valve permanently connected in a system line served by the pump, said valve having a fixed valve body having a fluid passageway extending therethrough to said system line, a movable valve member having a first orifice at least as large as the inside diameter of said system line for permitting unrestricted flow of hydraulic fluid through said valve when said movable member is in a first position and a second orifice smaller than the inside diameter of said system line for restricting flow of hydraulic fluid through said valve when said movable member is in a second position, and manually operable means for moving said movable member between said first and second positions, said valve body forming a test opening leading from an exterior surface of the valve body to said fluid passageway on the pump side of said movable valve element; a connecting member attached to said valve body at the exterior end of said test opening and including a closure for opening and closing said test opening; and a pressure gage adapted for connection to said connecting member for measuring the pressure in said system line when said movable valve member is in said second position to provide an indication of the efficiency of said pump.

2. A testing system as set forth in claim 1 wherein said valve is a spool type valve.

3. A testing system as set forth in claim 1 wherein said valve is a ball type valve.

4. A testing system as set forth in claim 1 wherein said valve is a plug type valve.

5. A testing system as set forth in claim 1 wherein said valve is a plunger type valve.

6. A testing system as set forth in claim 1 wherein said movable valve member is biased toward said first position.

7. A testing system as set forth in claim 1 wherein said pressure gage has a dial which is calibrated to indicate whether the pump is operating at a satisfactory or unsatisfactory efficiency level.

8. A testing system as set forth in claim 7 wherein said pressure gage dial is also provided with numerical indicia to indicate the magnitude of the measured pressure.

9. A testing system as set forth in claim 1 wherein said closure is opened automatically upon the connection of said pressure gage to said connecting member.

10. A method of testing the efficiency of a hydraulic pump in the field, said method comprising the steps of connecting a valve in a system line served by the pump to be tested, said valve having a fixed valve body having a fluid passageway extending therethrough and connected at opposite ends to said system line, and a movable valve member having a first orifice at least as large as the inside diameter of said system line for permitting unrestricted flow of hydraulic fluid through said valve when said movable member is in a first position, and a second orifice smaller than the inside diameter of said system line for restricting flow of hydraulic fluid through said valve when said movable member is in a second position, said valve body forming a test opening leading from an exterior surface of the valve body to said fluid passageway, removing the normal load from said system line, connecting a pressure gage to said test opening, moving said movable valve member to said second position, and determining the efficiency of the pump by measuring the pressure sensed by said gage while the pump is operated at a preselected speed and temperature with a preselected hydraulic fluid.

11. A test method as set forth in claim 10 wherein the efficiency of said pump is determined by comparing the measured pressure with the standard specified pressure for said pump operated at said preselected speed and temperature with said preselected hydraulic fluid.

* * * * *